United States Patent [19]
James et al.

[11] Patent Number: 5,528,931
[45] Date of Patent: Jun. 25, 1996

[54] ENGINE DIAGNOSTIC MONITOR WITH ON-BOARD ADJUSTMENT OF CORRECTION FACTORS

[75] Inventors: John V. James, Walled Lake; Kenneth A. Marko, Ann Arbor; James M. Dosdall, Grosse Ile, all of Mich.

[73] Assignee: Ford Motor Company, Dearborn, Mich.

[21] Appl. No.: 417,356

[22] Filed: Apr. 5, 1995

[51] Int. Cl.$^6$ .................................................. G01M 15/00
[52] U.S. Cl. ...................................... 73/117.3; 364/431.07
[58] Field of Search ............................. 73/116, 117.3; 123/419, 436; 364/431.07

[56] References Cited

U.S. PATENT DOCUMENTS

| | | | |
|---|---|---|---|
| 5,041,979 | 8/1991 | Hiraka et al. | 73/116 |
| 5,044,195 | 9/1991 | James et al. . | |
| 5,079,945 | 1/1992 | Hansen et al. | 73/116 |
| 5,088,318 | 2/1992 | Osawa | 73/117.3 |
| 5,117,681 | 6/1992 | Dosdall et al. . | |
| 5,237,862 | 8/1993 | Mangrulkar et al. . | |
| 5,263,364 | 11/1993 | Nakayama et al. . | |
| 5,263,453 | 11/1993 | Wakahara et al. | 73/117.3 |
| 5,269,178 | 12/1993 | Vigmostad et al. . | |
| 5,275,037 | 1/1994 | Nakayama et al. | 73/117.3 |
| 5,287,282 | 2/1994 | Imai . | |
| 5,307,671 | 5/1994 | Akase | 73/117.3 |
| 5,331,848 | 7/1994 | Nakagawa et al. | 73/116 |
| 5,361,629 | 11/1994 | McCombie | 73/117.3 |
| 5,377,112 | 12/1994 | Brown, Jr. et al. | 73/117.3 |
| 5,377,537 | 1/1995 | James . | |
| 5,394,742 | 3/1995 | Angermeier et al. | 73/117.3 |
| 5,415,035 | 5/1995 | Shimasaki et al. | 73/117.3 |

FOREIGN PATENT DOCUMENTS 2245933  1/1992  United Kingdom .

Primary Examiner—Richard Chilcot
Assistant Examiner—Eric S. McCall
Attorney, Agent, or Firm—Mark Mollon; Roger L. May

[57] ABSTRACT

A system and method compensates for systematic irregularities in measured engine velocities caused by torsional flexing in the crankshaft during rotation to improve the accuracy of misfire detection. A set of generated correction factors is stored in a table that are derived empirically using a test engine. The correction factors are adjusted during on-board operation of the engine whenever a safe adaptation time is determined.

15 Claims, 10 Drawing Sheets

ENGINE DIAGNOSTIC MONITOR WITH ON-BOARD ADJUSTMENT OF CORRECTION FACTORS

CROSS-REFERENCE TO RELATED APPLICATIONS

This application is related to copending application Ser. No. (94-0356), entitled "Adaptive Correction of Torsional and Wheel Profile Position Errors for Misfire Detection", filed concurrently herewith and which is hereby incorporated by reference.

BACKGROUND OF THE INVENTION

The present invention relates generally to on-board diagnostic monitors for internal combustion engines such as misfire detectors, and more specifically to on-board adjustment of correction factors used by the diagnostic monitor.

One way to detect misfires in internal combustion engines is to measure crankshaft speed and observe fluctuations in speed. Detection of deviations in crankshaft velocities (as manifested by abnormal acceleration values) from expected normal crankshaft velocities is an indication of misfire. Deviations in acceleration are determined over nominally equal successive intervals of crankshaft rotation, referred to as "Profile-Ignition-Pick-Up intervals" (PIP intervals). A PIP signal is a digital signal received from a sensor, which detects specified positions of rotation of a crankshaft mounted wheel during engine rotation. PIP intervals are also known as combustion intervals, which are equal in length (but not necessarily phase) to the angular rotation between top dead centers of adjacent cylinders in the firing order.

Ideally, during normal operation, an engine will produce a series of PIP transition signals whose periods are inversely related to the average crankshaft velocity during a substantial portion of the power stroke for each of the cylinders in the engine. The crankshaft velocity will either remain constant (zero acceleration), increase (positive acceleration) or decrease (negative acceleration) depending on whether the engine is operating at steady state, accelerating or decelerating, respectively. For example, if a normal engine is operating under steady-state operation (no acceleration), then acceleration values of near zero are expected over successive PIP intervals. However, if a particular cylinder in an engine produces a sufficiently negative value during steady-state operation, then this occurrence will be interpreted as a misfire condition, since a zero value is expected as an output for all cylinders in a normal engine during steady state operation.

Accordingly, misfire detectors typically look for individual cylinders yielding acceleration values different from the local norm of all cylinders, where the local norm depends upon the operating condition (i.e., steady state, acceleration, or deceleration, etc.). The problem is that individual cylinders in normal engines tend to yield values of velocity that differ slightly from the local norm of all cylinders in a systematic manner according to cylinder number. In a normally operating engine, this systematic variation will interfere with the misfire detection system's ability to detect abnormal behavior due to misfire.

There are at least two sources of such cylinder-specific-irregularities. The first is discussed in U.S. Pat. No. 5,117,681 to Dosdall et al., incorporated herein by reference. Dosdall et al. deals with systematic irregularity arising from PIP spacing of the wheel. If the wheel which serves as the position encoder on the crankshaft is even slightly irregular in PIP-interval spacing (e.g., a few tenths of a degree difference), then a normal engine operating at constant true PIP-to-PIP velocity (steady state) will appear to be experiencing subtle velocity changes (hence, non-zero acceleration values). The velocity changes will appear to coincide with the particular cylinders associated with the irregular PIP intervals. Although the degree of impact that a given wheel error has on the acceleration calculation is strongly rpm-dependent, the error itself is fixed, and so it can be empirically determined at any operating condition, even deceleration.

Dosdall et al. prefer to employ defueled coast down when sensing encoder errors. The reason is to avoid uneven acceleration due to firing events during data collection, since with no fuel, all cylinders are unpowered. Application of the process specified in Dosdall et al to coast down data yields a set of values which indicates the actual PIP-interval spacings of the wheel relative to the nominal values (i.e., assumed equal spacing). There are only n/2 unique correction values derived in this manner, since crankshaft mounted wheels typically have half as many PIP-intervals as engine cylinders (n). Each individual correction value is used twice per engine cycle.

The second problem, discussed in U.S. Pat. No. 5,377,537, issued to James and incorporated herein by reference, is that even under normal operating conditions the crankshaft will produce different amounts of speed-up and slow-down because of the non-rigid (torsional) behavior of the crankshaft. Since the crankshaft is not rigid, it produces subtle, but reproducible oscillations (due to crankshaft flexing) in the PIP signal (systematic "noise"). This noise tends to camouflage true misfires and can cause an erroneous indication of one or more cylinders as having misfired even when engine operation is in fact normal. For example, cylinders at the front of a crankshaft might affect the speed of the crankshaft at the measuring point slightly differently than cylinders at the rear. The effects of crankshaft-torsional-flexing can occur when the power is cut-off (as in the Dosdall et al. patent), because inertial torques produce uneven motions (acceleration). In general, the effects of such torsional variations on the calculated acceleration values are most pronounced at higher engine speeds as manifested in typical engine data.

U.S. Pat. No. 5,377,537 discloses a method for removing the effects of torsional oscillations by applying correction factors to velocity measurements and using the corrected velocities (or accelerations) for misfire detection. Correction factors for each of the n PIP intervals of an engine cycle are generated for each of a multitude of engine operating conditions. Each set of n generated correction factors is stored in a table (a "look-up table" located in a memory unit) and has a corresponding unique address location. This table is determined empirically in the calibration of the engine type by a test engine. The correction factors are generated while the test engine is rotated at a fixed steady state operating point with combustion, where the operating point is typically a particular speed and load. The table is loaded in memory units of production vehicles. During operation, measured operational parameters from the engine (e.g., a particular speed and load) are used as an address to retrieve correction factors stored in the look-up table.

Although a test engine characterizes the expected torsional oscillations for a particular engine design reasonably well, production engines of that same design may exhibit individual variation and may also experience changes as the engines wear with use. Therefore, the effectiveness of a predetermined look-up table may be reduced over time unless it is adjusted or adapted for the changes.

Adaptation of correction factors for inaccuracies in the placement of position markers on a crankshaft position sensor is shown in U.S. Pat. No. 5,237,862 issued to Mangrulkar et al. Adaptive correction methods, however, must overcome several difficulties. The basis of adaptation is that the correction factors should be derived during a time when misfire or other malfunction is not present. Thus any adaptive learning of correction factors must be disabled under conditions of misfire. However, detection of a misfire depends upon the capability of the correction which itself depends upon the ability to detect a misfire, leading to a circular problem that adaptation cannot be achieved until adaptation is achieved. In addition, if updating of the learned correction factor is cutoff during conditions of misfire and if engine conditions are changing during that same period, the latest available correction factors may become inaccurate. Furthermore, it is possible that the adaptive correction may adapt to a gradual onset of power loss in a cylinder and thus become incapable of detecting an actual power loss that has reached the required threshold.

SUMMARY OF THE INVENTION

The present invention provides on-board adjustment of correction factors used by an engine diagnostic monitor, wherein the adjustment is not subject to the disadvantages described above. A correction factor originally obtained from a test engine is dynamically modified on-board a production engine in response to the detection of a time when it is safe to perform the adaptation.

More specifically, the invention provides a method for detecting malfunctions in an internal combustion engine. An engine variable is measured. A selected diagnostic variable is determined in response to the measured variable and a correction factor, wherein the correction factor reduces the effects of a known source of error in determining the selected diagnostic variable. A diagnostic classification is produced in response to the selected diagnostic variable and a diagnostic threshold set in accordance with a first false alarm rate. A malfunction signal is generated in response to the diagnostic classification. A safe adaptation classification is produced in response to the selected diagnostic variable and an adaptation threshold set in accordance with a second false alarm rate higher than the first false alarm rate. The correction factor is adapted by assigning a new value to the correction factor that tends to modify the determination of the selected diagnostic variable toward a predetermined value when the safe adaptation classification corresponds to an absence of a malfunction.

DETAILED DESCRIPTION OF THE PREFERRED EMBODIMENTS

The present invention employs similar sensing apparatus as those used in U.S. Pat. No. 5,117,681 to Dosdall et al., incorporated herein by reference. A brief overview of these sensing devices is provided below.

Figure 1:
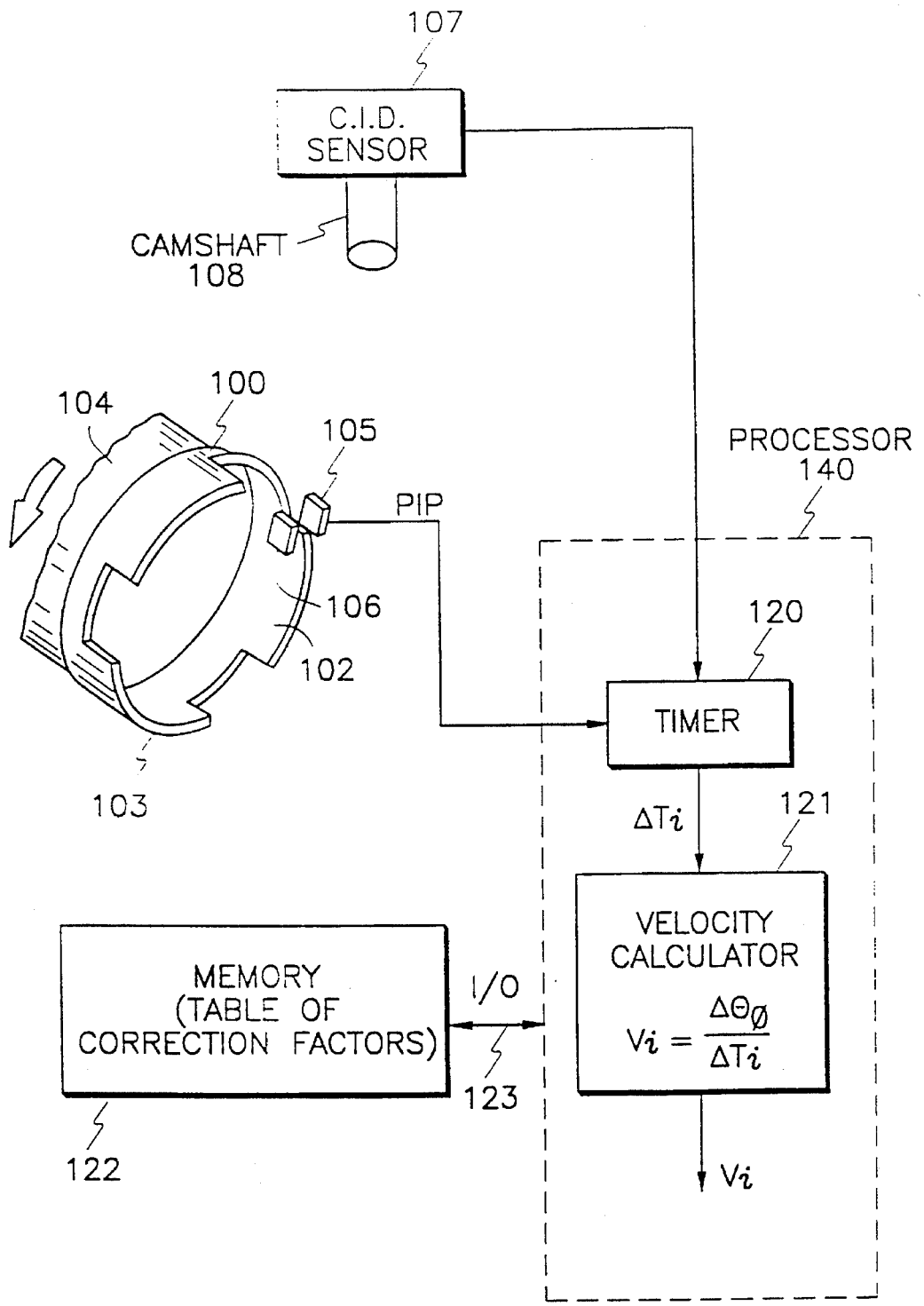
FIG. 1 illustrates an example position sensing and velocity measuring system employed by the present invention.

FIG. 1 illustrates an example position sensing and velocity measuring system employed by the present invention. The engine rotation position sensing system of FIG. 1 includes a rotor 100 including vanes 101, 102, and 103 which rotate with a crankshaft 104 (a three-vane rotor from a 6-cylinder engine is shown in this example). The vanes 101–103 pass between a hall effect sensor 105 and a permanent magnet 106 to generate a profile ignition pulse (PIP) signal 107 as the crankshaft 104 rotates. Vanes 101–103 are typically arranged to generate a rising edge in the PIP signal 10° before top dead center (in the preferred embodiment, falling edges 70° before and 50° after top dead center for a six cylinder engine) of each respective cylinder.

The rising edge in the PIP signal actually indicates the approach to top dead center of two engine cylinders, one of which is approaching a power stroke and one of which is approaching an intake stroke since it takes two full crankshaft rotations to complete an engine cycle.

A cylinder identification (CID) sensor 107 is connected to a camshaft 108 for identifying which of the two cylinders is actually on its power stroke. Since camshaft 108 rotates once for every two rotations of crankshaft 104, a CID signal is preferably generated having a rising edge corresponding to the power stroke of cylinder No. 1.

A timer 120 receives the PIP signal and the CID signal and measures elapsed time between predetermined engine position locations as determined by the CID and PIP signals (preferably between falling edges of PIP). The elapsed time $\Delta T_i$ for each velocity measuring interval is output from timer 120 to a velocity calculator 121 where the assumed angular spacing $\Delta \theta_0$ is divided by time $\Delta T_i$ to provide the velocity value $V_i$.

In the preferred embodiment, timer 120 and velocity calculator 121 are parts of firm/software in a processor system ("Processor") 140. Timer 120 and velocity calculator may also be implemented as hardware. A memory device 122 is coupled to processor 140 via a bi-directional bus 123.

Figure 2:
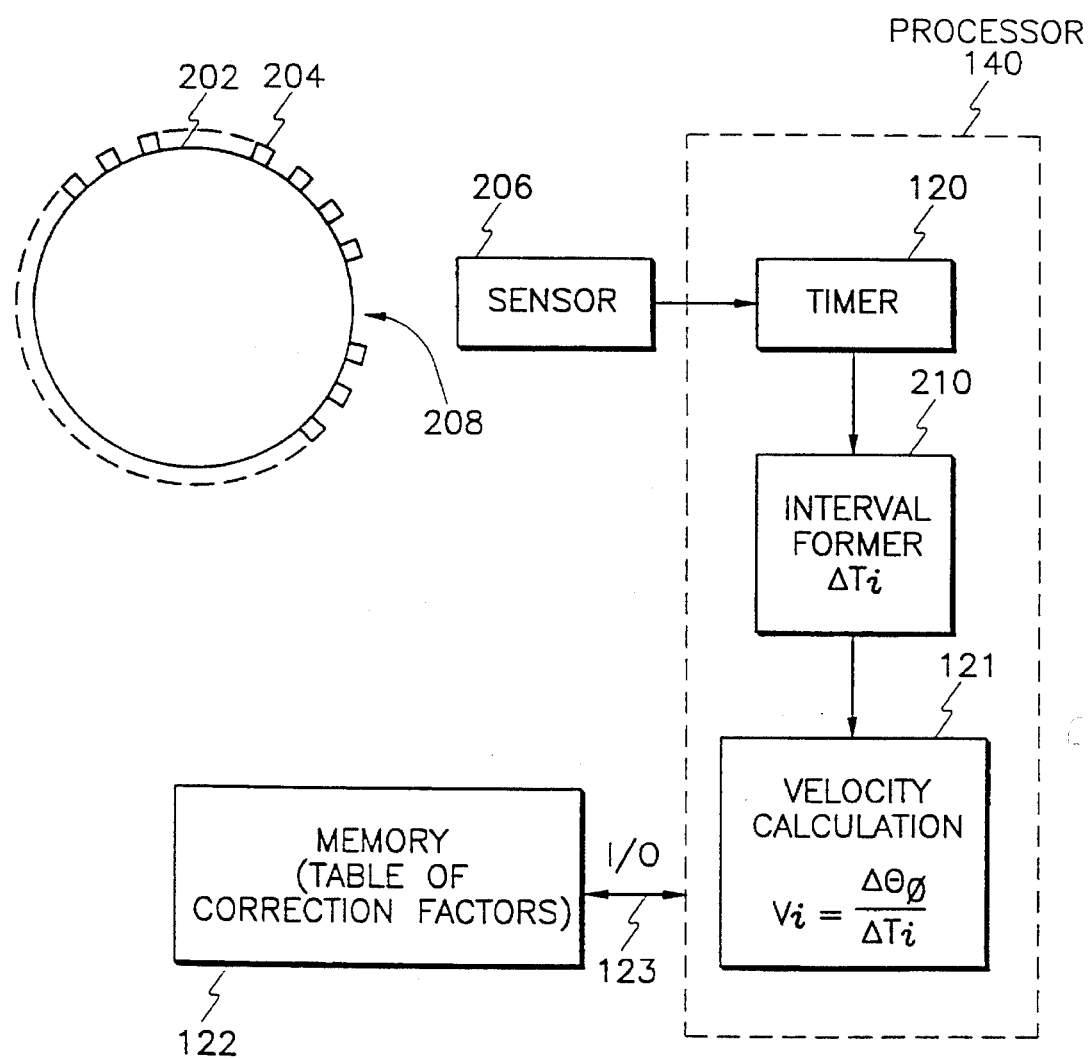
FIG. 2 illustrates an alternative embodiment of a position sensing and velocity measuring system employed by the present invention.

An alternative embodiment of position sensing apparatus is shown in FIG. 2. A multi-toothed wheel 202 is mounted on an engine for rotation with the crankshaft. A plurality of teeth 204 are disposed along the periphery of wheel 202 at a predetermined angular spacing. A sensor 206 is disposed in a fixed location closely spaced to teeth 204 for sensing when each tooth passes sensor 206.

In the preferred embodiment, a missing tooth location 208 is provided on wheel 202 to establish an absolute location reference, e.g., at 90° before top dead center of cylinder No. 1.

Sensor 206 is connected to timer 120 and velocity calculator 121 as described with reference to FIG. 1. However, since the velocity measuring intervals in this embodiment are longer than the spacing of teeth 204, an interval former 210 is disposed between timer 120 and velocity calculator 121 in order to provide the sum of the measured time periods for the consecutive teeth which are included in the particular velocity interval to be measured. As shown in FIGS. 1 and 2, timer 120, velocity calculator 121 and interval former 210 may preferably be implemented in the programmed processor 140.

Figure 3:
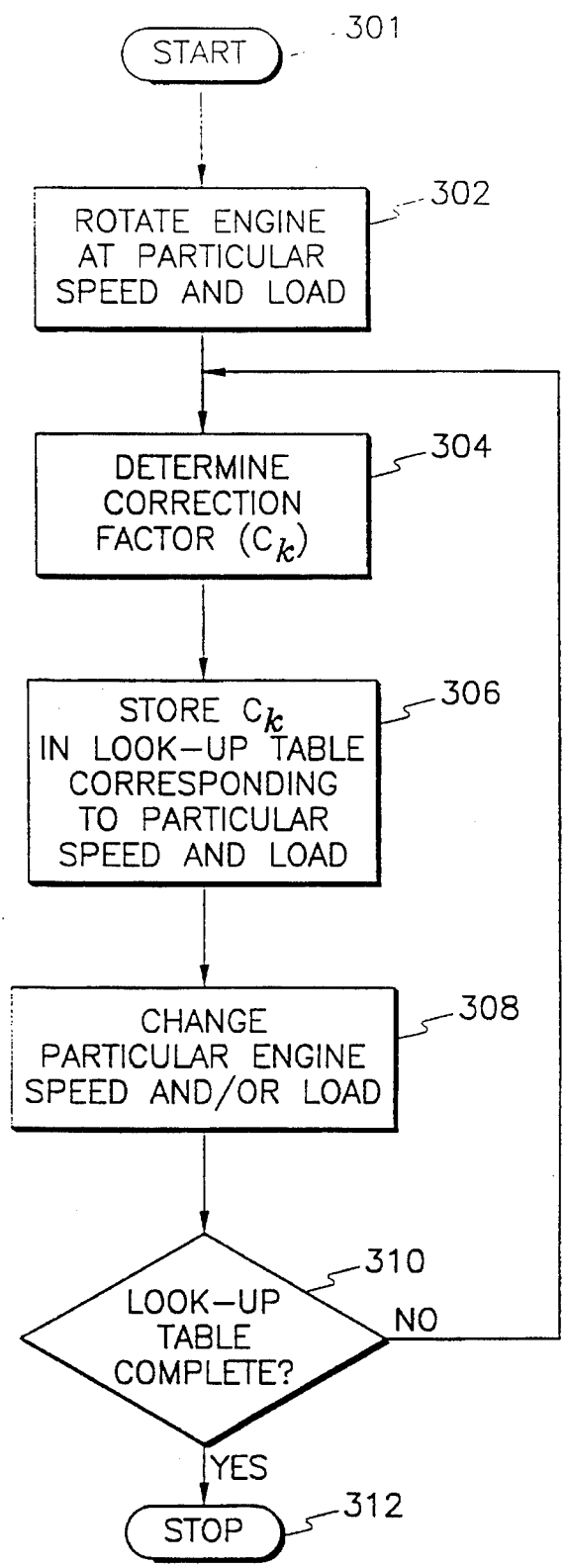
FIG. 3 is a flow chart illustrating the procedural steps used by a processor to obtain correction factors ($C_k$), according to the present invention.

According to the present invention, compensations (correction factors) are made for systematic irregularities arising from true velocity fluctuations of crankshaft mounted wheels 100, 202 due to the dynamics of the individual cylinders producing torque at differing locations on a flexible crankshaft 104. FIG. 3 is a flow chart illustrating the procedural steps used by processor 140 to obtain correction factors ($C_k$).

Referring to FIG. 3, in step 302 the engine is rotated at a fixed steady state condition. "Steady state" means that the engine is rotated at a particular speed and load during powered operating conditions, where speed is in Revolutions-Per-Minute (RPM) and load is a percentage of full air charge, which is nominally proportional to torque. For example, it may first be desired to measure the response of the engine at 2000 RPM with a load of 0.50 (where the load is measured as a scale from 0-to-1 of the maximum air charge that the engine is capable of taking-in to create torque). The number of load and speed points selected for generating the look-up table is dependent upon accuracy required of the system and the engine being characterized. Speed and load are the two most important factors that effect torsional effects in the crankshaft 104. However, it is contemplated to employ operational parameters other than speed and load (e.g., spark advance and Exhaust Gas Recirculation (EGR), which are typically found to effect engine torque, and hence, the degree of torsional flexing of the crankshaft 104.

In step 304, a unique set of correction factors, one for each cylinder, is determined for each unique steady state operating point (particular speed and load) from data collected over N complete cycles of a normally operating engine. These correction factors are denoted $C(_k)$: where k=1 to n, and where n is the number of cylinders in the engine. For purposes of implementation, it is convenient to number cylinders by their position in the engine firing sequence, rather than by cylinder number designation. Thus, $C_1$ is the correction factor at a given operating condition for cylinder 1, $C_2$ is the corresponding factor for the next cylinder in firing order, and so forth.

Figure 4A:
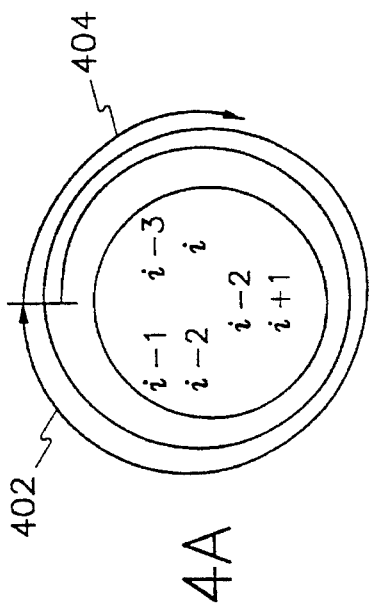
FIG. 4A graphically depicts two revolutions of a position encoder during one complete cycle of an example six-cylinder engine, according to the present invention.

The correction factor for the $k^{th}$ cylinder is based on the average ratio of each PIP-interval velocity (denoted $V_i$) associated with cylinder k, to the average velocity (denoted $W_i$) over an entire engine cycle substantially centered on the PIP interval. This relationship is graphically depicted in FIG. 4A, which represents two revolutions of a position encoder during one complete cycle 402 of an example six-cylinder engine (where a PIP interval is denoted 404). The six measurement intervals are designated i−3, i−2, i−1, i, i+1, i+2, where a single estimate of the correction factor for interval i is to be determined. The two velocities calculated for each i are the average velocity ($V_i$) over the PIP interval 404 (length 120°) and the average velocity ($W_i$) over the entire engine cycle 402 (length 720° or calculated over a plurality of engine cycles 402).

Figure 4B:
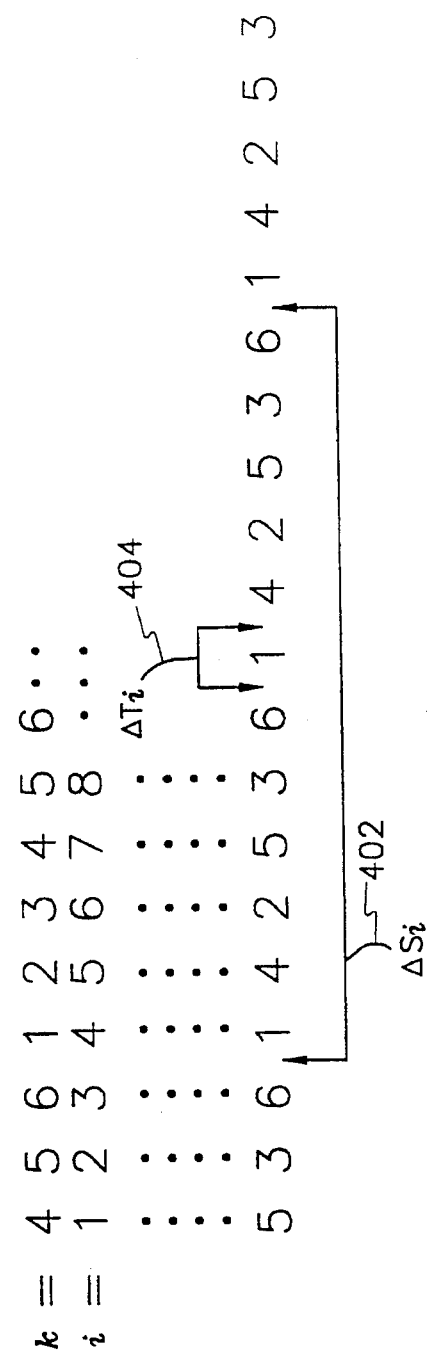
FIG. 4B illustrates PIP intervals arranged linearly along a time line over an entire engine cycle as shown in FIG. 4A.

These intervals are also illustrated in FIG. 4B, showing the PIP intervals 404 arranged linearly along a time line. The ratio of $W_i$ over $V_i$ during steady-state operation is a measure of the correction factor for the particular cylinder during the $i^{th}$ interval. This measurement must be repeated for many subsequent intervals at the same operating condition, in order to provide repeated measurements of the correction factors for each of the PIP intervals comprising an engine cycle 402. As shown in FIG. 4B, each PIP interval 404 can be measured by its corresponding change in time $\Delta t_i$ and each entire engine cycle 402 can be measured by its change in time denoted $\Delta s_i$.

Averaging the results separately for each of n cylinders is performed for data collected over N-cycles according to equation (1.0) to obtain the correction factors:

$$C_k = \frac{1}{N} \sum_{i \in S_k} \frac{W_i}{V_i} \quad \text{(eq. 1.0)}$$

where the restriction of i values in the summation to elements of set $S_k$ merely indicates the intervals which are associated with cylinder k. For example, a data set which begins with cylinder 1 would yield a set $S_1=\{i:i=1,7,13,19, \ldots\}$, for a six-cylinder engine. The i values for calculating correction factor $C_2$ would be the set $S_2=\{i:i=2,8,14,20 \ldots\}$, and so forth. It should be noted that $$W_i = \frac{720°}{\Delta s_i} \text{ and } V_i = \frac{\Delta \theta_0}{\Delta t_i}, \text{ where } \theta_0 = \frac{720°}{n}.$$

Substituting these expressions into equation (1.0) yields an alternate but equivalent equation for $C_k$ as shown in equation (1.1):

$$C_k = \frac{n}{N} \sum_{i \in S_k} \frac{\Delta t_i}{\Delta s_i} \quad \text{(eq. 1.1)}$$

Next, in step 306, processor 140 stores correction factors obtained in step 304, in memory 122 as part of a "table of correction factors" also referred to as the "look-up table." The correction factor for each $C_k$ (where k= 1 to n) is written into memory 122 at an address which corresponds to the particular speed and load that the engine is operating. Memory 122 is preferably implemented using random-access memory (RAM), but may be any type of memory used with processors such as DRAM, SRAM, etc.

In step 308, an operational parameter (such as speed and/or load), which affects crankshaft torque, is modified to obtain additional correction factors. Steps 304, 306 and 308 are then repeated until the look-up table is complete, which is shown as the "YES" path of decisional step 310. Typically, the more correction factors that are generated and stored in memory 122, the more accurate will be the resulting system.

Once these correction factors are determined for each of a multitude of engine operating conditions, an adjustment to the correction factors stored in memory 122 is necessary to remove the contribution attributable to irregularities in the wheel interval spacings on the encoder wheel 100, 202 of the test engine as described in the Dosdall et al patent. Thus, each of the correction values in the table must be divided by the appropriate wheel correction fraction as described in the Dosdall et al. patent. The reason that the effect of wheel irregularity on the correction factors must be removed is to ensure that only the effects of torsional fluctuations of the crankshaft remain in the table of correction factors 122. This is necessary since the subtle irregularities in encoder wheels 100, 202 may vary from instance-to-instance in production, and can in fact be determined on an individual engine basis by a single coast-down test described in the Dosdall et al. patent.

In contrast, the pattern of torsional fluctuation at each speed and load is mostly a function of the engine design, and can be characterized in a table of correction factors in memory 122 having calibrated correction values.

Thus, the table of correction factors 122 is determined empirically in the calibration of the engine type by a test engine (or through simulation, if sufficiently sophisticated). Once the look-up table in memory 122 is complete, it can be implemented in production vehicles. This look-up table of memory 122 allows corrections factors $C_k$ to be determined for each engine operating condition. For instance, if the engine were operating at 2000 RPM at a load of 0.25, these two operating parameters would be used as an index (or address) (via bus 123 shown in FIGS. 1 and 2) to the look-up table of memory 122 (the load input to bus 123 is not shown in FIGS. 1 and 2). The output, via bus 123, of the look-up table would be the correction factors $C_k$ corresponding to the operating conditions of 2000 RPM at a load of 0.25. Interpolation can be used to estimate each of n correction factors from the nearest adjacent points in the look-up table of memory 122, if the operational parameters do not exactly match the indexed value in the look-up table of memory 122.

Figure 5:
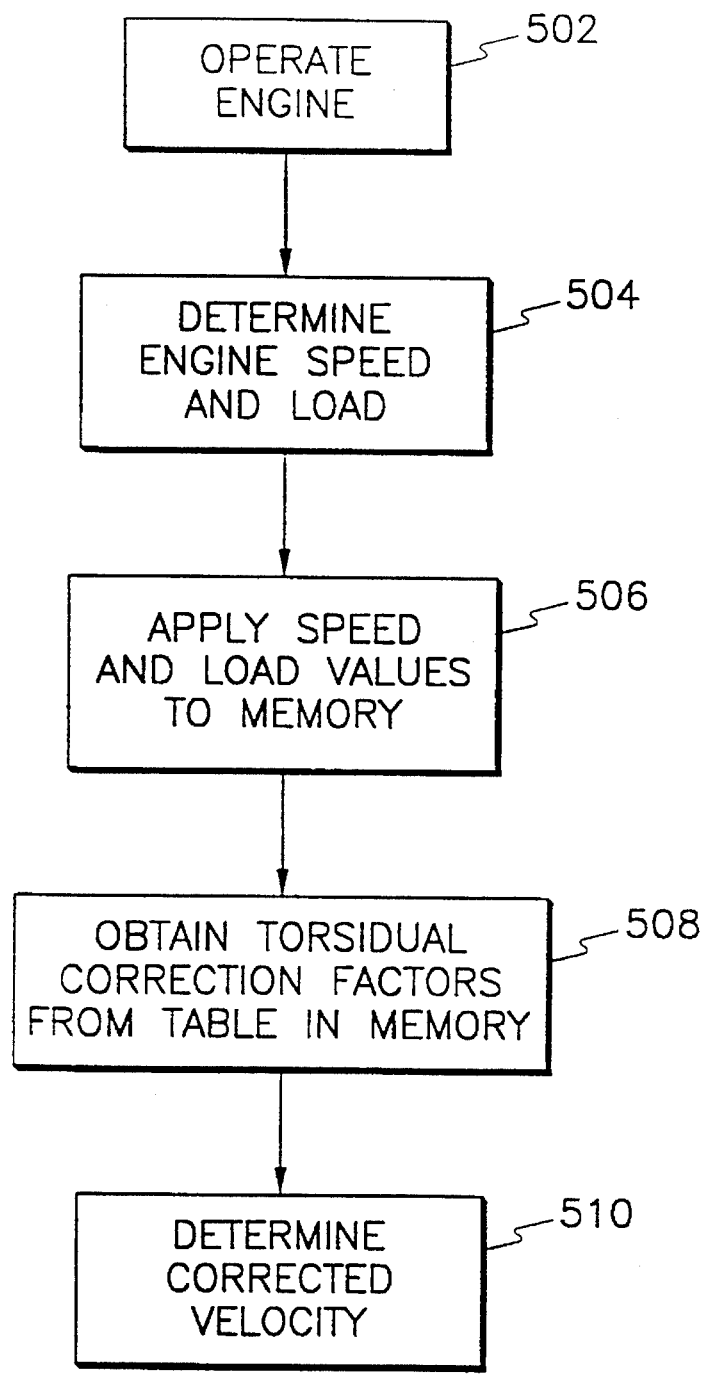
FIG. 5 is a flow chart illustrating how the torsional correction factors are deployed in a production vehicle having an internal combustion engine.

Deployed in production vehicles, the table of torsional correction factors are utilized in conjunction with the set of correction factors for the wheel to obtain corrected velocity measurements $V'_i$ of an engine. FIG. 5 is a flow chart illustrating how the torsional correction factors are deployed in a production vehicle having an internal combustion engine.

Referring to FIG. 5, in step 502, the engine is rotated at a particular speed and load according to driving conditions typically encountered by a production vehicle in day-to-day use. In step 504, each new speed and load of the engine is measured as described above. In step 506, the speed and load values are employed as an input to memory 122 via bus 123 to retrieve a corresponding correction factor(s) from memory 122. It is not necessary to retrieve new correction factors every PIP interval, however, the system is generally more accurate if the correction factors are updated in a timely fashion. In step 508, the on-board computer (processor 140) calculates the set of n torsional correction factors appropriate for that operating condition by performing a two-dimensional interpolation from the values in the table of correction factors nearest to the current operating point (referred to as $C_k^*$, k=1 to n, where * implies the interpolated results from the table).

Then, in step 510, the correction factor $C_k^*$ obtained in step 508 from memory 122 is employed by the processor 140 to obtain the corrected velocity $V'_i$. Equation (1.2) shows one possible expression to calculate the corrected velocity:

$$V'_i = C_k^* B_k V_i \quad \text{(eq. 1.2)}$$

where: $V_i$ is the uncorrected velocity for the $i_{th}$ interval, $B_k$ is the wheel profile correction factor (as described in the Dosdall et al. patent), and $C_k^*$ is the current value of the torsional correction factor, and k is the cylinder number associated with the $i^{th}$ interval. Many alternative functions can be devised to obtain the corrected velocity. For example, after the wheel correction factors $B_k$ are determined in a particular engine, a new table of values $C_k' = C_k B_k$ can be formed and used in place of the table of $C_k$, thus combining these two correction factors into one table, thereby eliminating one extra multiplication at each subsequent velocity determination.

Likewise, other mathematical variants can be employed to derive correction factors from engine data. For example, an alternative method of deriving the $C_k$ is to perform a least squares fit of the corrected PIP-interval velocities to the cycle-average velocities. In other words, choose the $C_k$ so as to minimize an error defined in equation (1.3) as:

$$E = \sum_{i \in S_k} (V'_i - W_i)^2 = \sum_{i \in S_k} (C_k V_i - W_i)^2 \quad \text{(eq. 1.3)}$$

Well known techniques for setting $$\frac{\partial E}{\partial C_k}$$

equal to zero yield the alternative formula for $C_k$ as follows in equation 1.4:

$$C_k = \frac{1}{N} \frac{\sum_{i \in S_k} W_i V_i}{\sum_{i \in S_k} V_i^2} \quad \text{(eq. 1.4)}$$

In fact, it can be shown that equation (1.0) is equivalent to a least squares fit of the relative velocity differences, with the error defined by equation 1.5:

$$E = \sum_{i \in S_k} \left( \frac{V'_i - W_i}{V_i} \right)^2 \quad \text{(eq. 1.5)}$$

Applying the methodology of the present invention yields an effective system for removing systematic irregularities caused by torsional flexing in the crankshaft 104. The effectiveness of the present invention is illustrated by the example depicted in FIGS. 6A–6C, which show traces of Deviation Acceleration (DACCEL) determined from the PIP interval times of a six-cylinder engine operating at about 4000 rpm at light load. DACCEL is a fundamental detection parameter (sometimes referred to as "accel. deviation") (described in U.S. Pat. Nos. 5,095,742 to James et al., 5,044,194 to James et al., 5,044,195 to James et al., and 5,109,645 to James et al.) closely related to the acceleration of the crankshaft as manifest by changes in the PIP-interval velocities $V_i$.

Figure 6A:
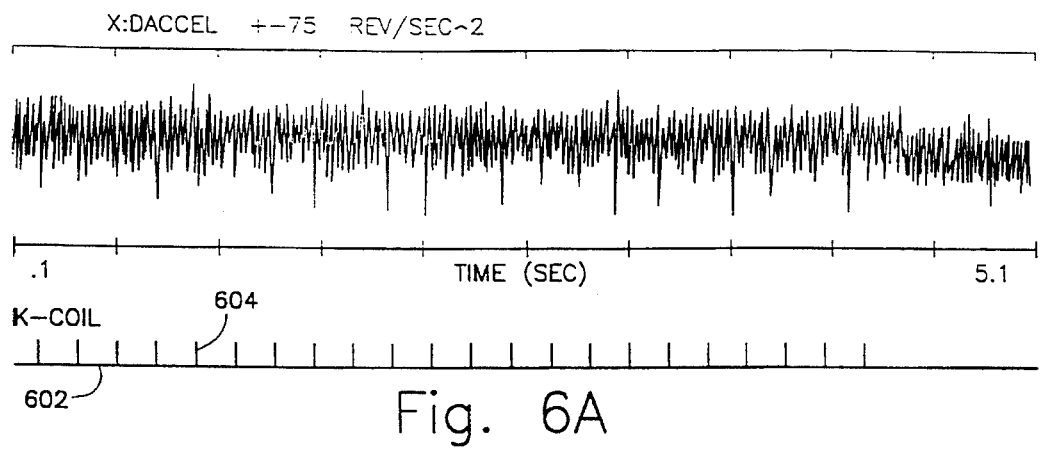
FIG. 6A shows a misfire detection signal calculated without any type of correction to the velocities.

FIG. 6A shows DACCEL calculated without any type of correction to $V_i$. The regular occurrences of misfire induced throughout the data file are only marginally visible above the noise at this engine speed and load. Occurrences of misfire may be determined from the K-COIL signal 602 (shown below the DACCEL trace in FIGS. 6A–6C), which records instances of intentional misfire creation (shown as a vertical spike 604).

Figure 6B:
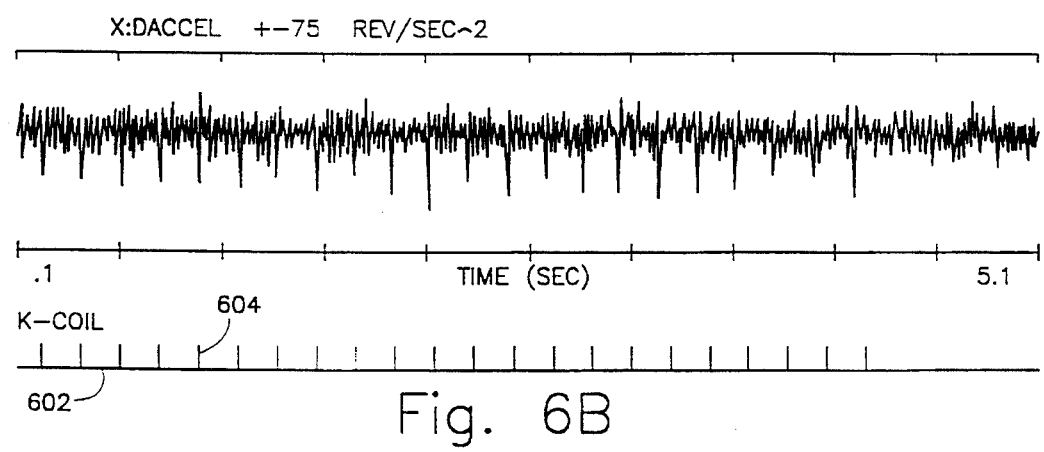
FIG. 6B shows the same misfire detection signal of FIG. 6A with some improvement in the signal-to-noise ratio after applying wheel-profile correction factors to the velocities.
Figure 6C:
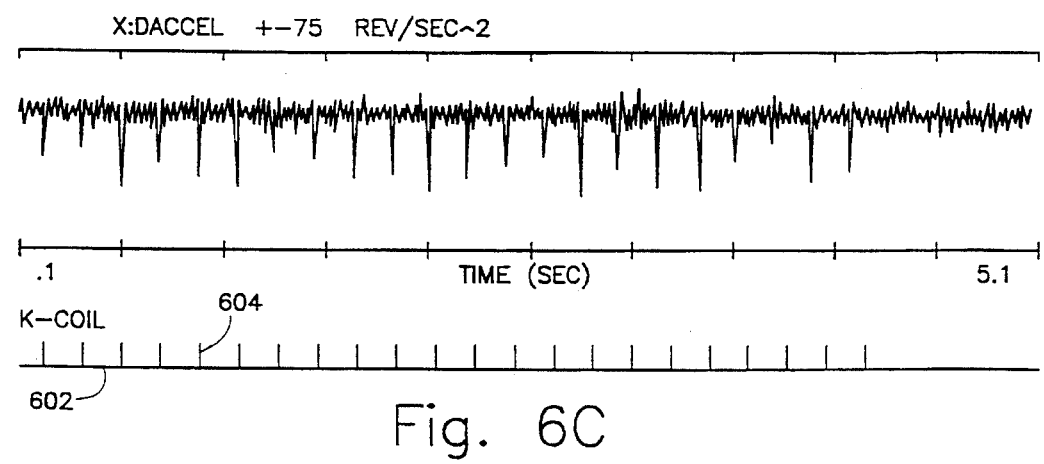
FIG. 6C shows the same misfire detection signal of FIGS. 6A–6B, but applying correction factors to compensate for torsional fluctuations according to the present invention, which provides much greater improvement resulting in the more distinguishable misfire signal.

FIG. 6B shows some improvement in the signal-to-noise ratio over the same points after applying wheel-profile correction factors to the velocities, as described in the Dosdall et al. patent. Correction for profile errors yields only a modest improvement in signal quality in this case, because the wheel on the engine used to generate this data was already fairly accurate. However, applying correction factors to compensate for torsional fluctuations as described above provides much greater improvement, resulting in the more distinguishable misfire signal as shown in FIG. 6C according to the present invention.

Tests at other speed and load points yield similar improvements, but with slightly different correction parameters on account of the differing torsional effects. As explained above, a look-up table in memory 122 can be created to allow interpolation of the proper correction at each speed and load point, while the engine rotates.

Alternative forms of compensation for wheel irregularities or torsional effects exist which can be shown to be mathematically equivalent to the multiplicative corrections explained above. For instance, acceleration values calculated from uncorrected velocities can be modified by additive corrections, $D_k$ as in equation (2.0):

$$A_i = A_i + D_k \quad \text{(eq. 2.0)}$$

where, to a very good approximation, these corrections are related to the multiplicative correction factors according to equation (2.1):

$$D_k = \frac{V_i^2}{\Delta\theta_0}(C_{k+1} - C_k) \quad \text{(eq. 2.1)}$$

where the $\Delta\theta_0$ is the angular spacing between points on the encoder wheel. Even though these corrections to acceleration are additive, not multiplicative, equation (2.1) shows that the $D_k$ values have a strong dependence on engine speed, through the term $V_i^2$, even if factors $C_k$ are independent of speed (as in the case of wheel profile correction). As a result, it is preferred to apply correction in the calculation of velocity instead of acceleration. However, either method will accomplish the task of correction for effects which diminish the signal quality of misfire detection by crankshaft speed fluctuations.

In order to make dynamic adjustments to the torsional correction table on-board each individual engine during in-use driving conditions requires knowledge whether data is gathered from a normally operating (non-misfiring) engine, which is a difficult determination to make under uncontrolled field conditions. Nevertheless, applicants have invented a technique to gradually adapt the table of correction factors while avoiding the concerns with respect to on-board learning discussed earlier. In particular, the invention uses a set of base values for the correction factors that are derived from a test engine and adapts these values very slowly since it is only necessary to track changes resulting from aging of the engine and not changes in speed, load, or other conditions of the engine during adaptation. Since adaptation can proceed very slowly, it is possible to be very selective in accepting data for interpolating new correction factor values. Therefore, adaptation is ceased whenever misfire or abnormal operation is even remotely suspected. The suspension of adaptation, however, does not preclude selection or interpolation of new correction factor values from the table as engine speed and load change, thus retaining the ability to detect misfire under all conditions.

In addition to the classification of cylinder events according to whether or not they represent a misfire, the present invention further performs a classification of cylinder events according to whether a safe adaptation time exists or not. Although the method of determining these two classifications may be similar, they are different in at least the important respect that the method for determining the safe adaptation classification has a higher acceptable false alarm rate (i.e., is more likely to call an event as a misfire or other malfunction).

Figure 7:
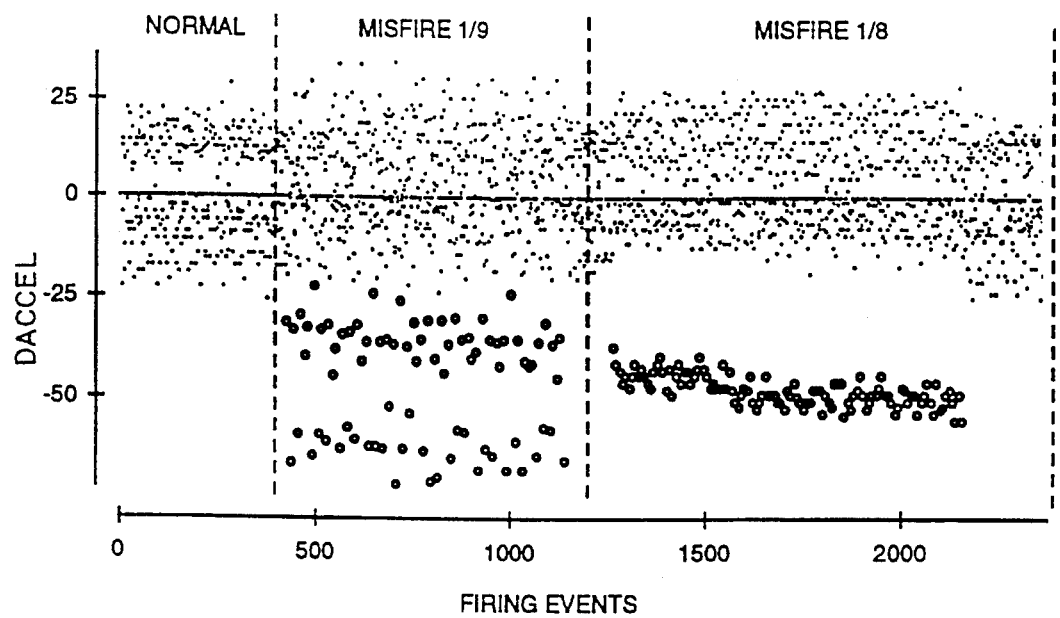
FIG. 7 is a plot showing uncorrected deviation acceleration for individual cylinder events with and without actual misfire being deliberately introduced.

Referring to FIG. 7, data from steady state operation of an 8-cylinder engine at moderately high speed (4500 rpm) at low load is shown with DACCEL values from normal firings represented as dots and DACCEL values from intentionally introduced misfire events represented as small circles. Values of DACCEL for each successive firing event is shown during periods of 1) no misfire, 2) misfire introduced at a rate of 1 in 9 events, and 3) misfire introduced at a rate of 1 in 8 events, as indicated. The data in FIG. 7 does not include compensation for torsional oscillations.

Under the engine conditions corresponding to FIG. 7, the two groups of cylinder events (i.e., normal and misfiring) are not sufficiently distinct from each other to reliably distinguish between them using a threshold (i.e., you cannot draw a horizontal line that completely separates the two groups). Setting the threshold to a level where it would detect nearly all occurrences of misfires would also yield to many false alarms (i.e., false declarations of misfire when a normal firing actually occurred). During vehicle use, the false alarm rate of a misfire detector must be kept very low in order to avoid false indication of engine problems (such as illumination of a malfunction indicator light connected to processor 140 in FIG. 1).

Figure 8:
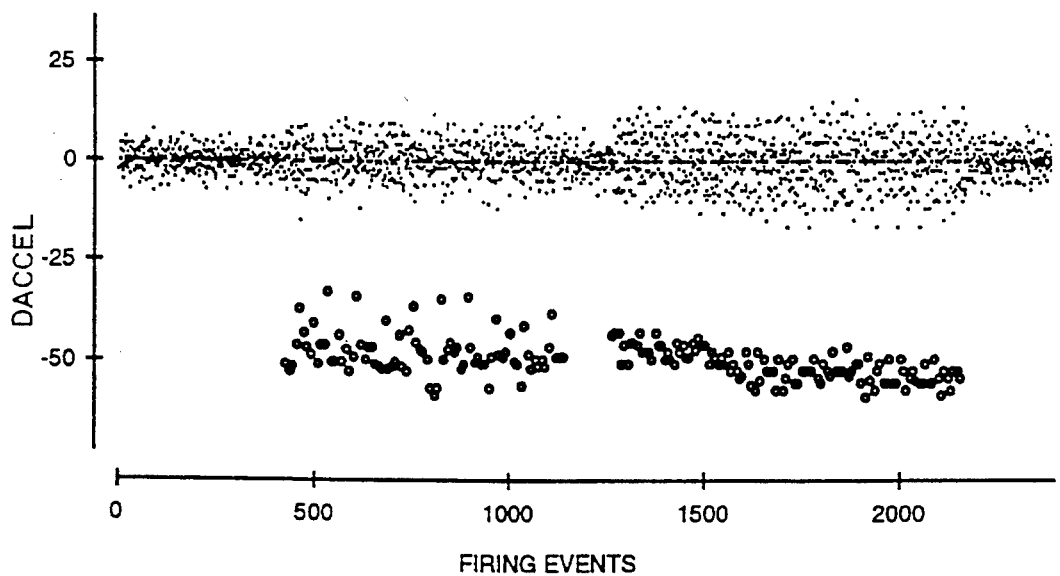
FIG. 8 is a plot showing deviation acceleration after applying the base correction factors to the data in FIG. 7.

FIG. 8 shows the results of torsional correction applied to the data of FIG. 7. The improved quality of this signal permits reliable misfire detection.

The data of FIG. 7 and the torsional correction shown in FIG. 8 correspond to a test engine prior to significant aging of the engine as discussed above. In order to always maintain near-optimum torsional correction at each engine operating point, however, the table of correction factors should be monitored and/or modified by an on-board strategy as needed throughout an engine's lifetime. Since modification of table values should only be made utilizing data from normal (i.e., non-misfiring) engine operation, it is necessary to know when to permit table modifications even if the distinction between normal and abnormal operation is as ambiguous as shown in FIG. 7. Although it might appear that such periods of normal engine operation could be identified using the torsionally corrected data of FIG. 8, such a solution would incur the problem mentioned earlier of inadvertently adapting to gradual power losses.

The present invention provides a method for classifying cylinder events according to a safe adaptation time wherein it is possible to distinguish between times of normal operation and times of malfunction or misfire. The method does not rely on use of the correction factors in making the safe adaptation classification, so that it is not possible to learn a malfunction as normal operation. Since it is possible to adapt the correction factor values at a very slow pace, the method need only identify some occasional periods of normal operation. Nevertheless, the determination of normalcy should be made with very high reliability. Although the method for determining a safe adaptation time must be highly reliable in detecting normalcy, it is acceptable to have a relatively high false alarm rate (thereby incorrectly calling some cylinder events as misfires) since more than adequate amounts of data will still be available to perform adaptation.

Figure 9:
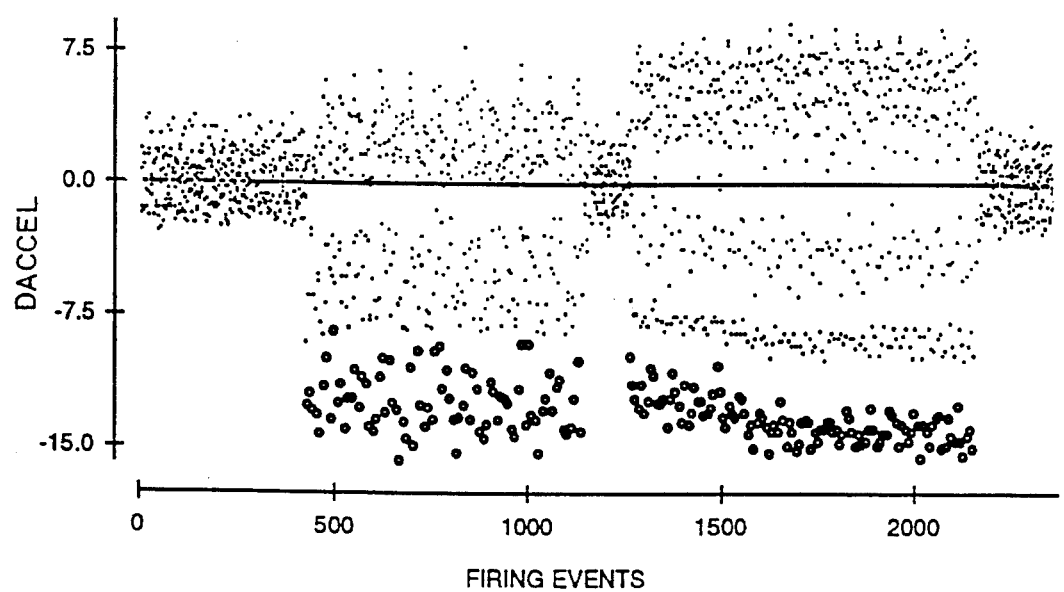
FIG. 9 is a plot showing deviation acceleration after applying lowpass filtering to the data in FIG. 7.

In a preferred embodiment of the present invention, a digital lowpass filter is applied to the acceleration values of FIG. 7 thereby producing the filtered DACCEL data shown in FIG. 9. The reduced bandwidth of the acceleration data provided by lowpass filtering reduces noise in the signal (whether from random events or synchronous events such as result from torsional fluctuations). Although the amplitude of the DACCEL signal is reduced by filtering and the difference between misfires and adjacent normal events is blurred, the difference between periods of engine operation with misfire present and periods of engine operation with no misfire is much more evident. Thus, it is a relatively straight forward task to set a DACCEL threshold that can easily identify periods when no misfire is occurring.

The lowpass filtering of acceleration data prior to comparison with a threshold has been used in some prior art misfire detection systems. However, there maybe some instances where such a system is inadequate for purposes of misfire detection. Because of the reduced bandwidth in the acceleration data, normal (i.e., non-misfiring) events that are adjacent to actual misfires are subject to signal distortion that increases their apparent partial power losses and might cause them to be erroneously declared as misfires. To avoid that problem, it is possible to assume that only single misfires occur and to count consecutive indications of misfire as only a single misfire. When real misfires occur in close proximity, however, they would be under counted. Furthermore, filtering causes uncertainty in making cylinder identification for a misfire event even where the misfires are widely spaced.

In detecting normal operation for purposes of enabling table adaptation, such shortcomings of the filtering method are not relevant. In producing a safe adaptation classification of the data, it is not necessary to determine accurately if misfire is above or below a certain rate, nor to identify cylinder number of any particular misfire. The safe adaptation classification function needs only to determine if the data is sufficiently normal to allow adjustment of torsional correction factors with new data. Any indication of abnormal behavior or misfire is sufficient cause to temporarily suspend table adaptation. Thus, after a safe adaptation classification indicates that it is not safe to adapt, further attempts to make a safe adaptation classification maybe suspended for a predetermined time or number of engine cycles.

Figure 10:
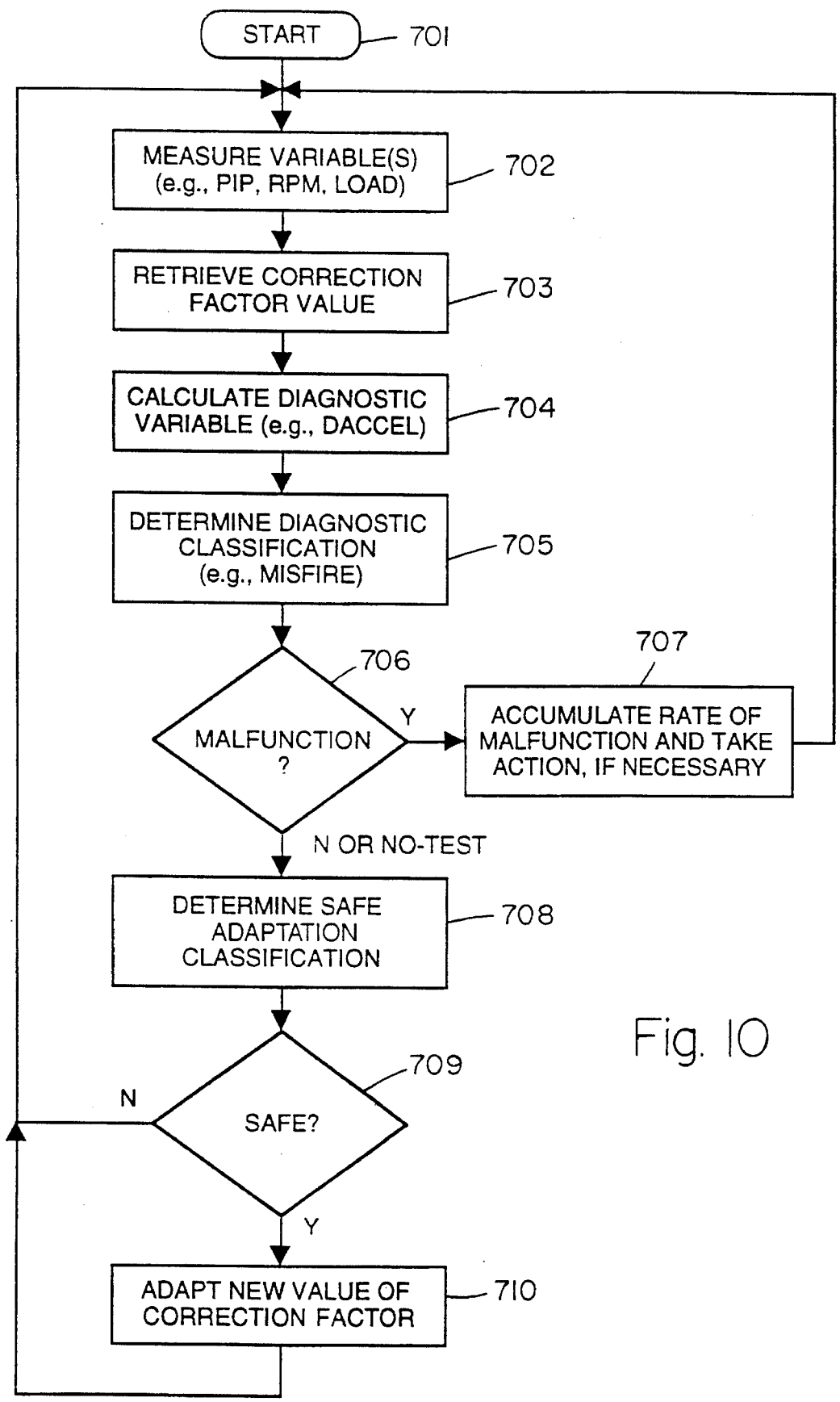
FIG. 10 is a flow chart illustrating a method for on-board adjustment of correction factors.

When the filtered DACCEL signal of FIG. 9 indicates that it is safe to modify the table values, a new value for the correction factor at the current operating point of the engine is derived using the unfiltered crankshaft data. The overall method of the preferred embodiment is shown in FIG. 10. During engine operation, several engine operating variables such as PIP interval, RPM, and load are measured in step 702. A correction factor value is retrieved in step 703 according to the table indexes such as RPM and load. A diagnostic variable such as DACCEL is calculated in step 704. A diagnostic classification is determined in step 705. In a misfire detector, diagnostic classifications call each event as a misfire, no misfire, or no test (i.e., not able to distinguish a misfire) as described in the previously mentioned patents.

In step 706, a check is made to determine whether the diagnostic classification of step 705 represented a malfunction (e.g., a misfire). If yes, then the rate of malfunction or misfires is accumulated in step 707. Any corrective action or indication of a malfunction condition is performed as necessary if the accumulated rate of misfire exceeds a predetermined rate. Then, a return is made to step 702 to measure further variables.

If step 706 determined that either no malfunction was present or a no test condition was present, a safe adaptation classification is determined in step 708. In the preferred embodiment, the filtered DACCEL data shown in FIG. 9 is judged against a criterion such as comparison with a threshold that distinguishes between periods of engine operation that are normal and periods that possibly include misfire events. A check is made in step 709 to determine whether the safe adaptation classification represents a safe adaptation time. If not, a return is made to step 702 to measure further engine variables. If yes, then a new value of a correction factor is adapted in step 710. The actual new value is derived by determining the correction factor value that would modify the calculated diagnostic variable (DACCEL) to a predetermined value indicative of normalcy (e.g., zero). Using that result, the existing correction factor value is incrementally modified by a fraction of the difference.

Lowpass filtering of DACCEL data can be obtained using an explicit filter, such as a digital filter, or an implicit filter, such as would be obtained by lengthening the velocity measurement intervals (e.g., combining several PIP intervals prior to calculating velocity). It should be noted that although filtered DACCEL data is used to determine a safe adaptation time in step 708, only unfiltered data is used in determining the actual correction in step 710 and in detecting misfires in steps 704 and 705.

Since the preferred embodiment uses a combined correction factor table (i.e., where the original correction factor values stored in a particular vehicle embody the torsional correction factors from the test engine multiplied by the wheel profile correction factors for the individual engine in the particular vehicle), it is not necessary to explicitly account for wheel profile correction in the adaptation. In other embodiments where wheel profile correction factors are maintained and applied to the velocity data separately, it is necessary to remove them from the newly adapted correction factor values prior to adjusting the values stored in the torsional correction table.

Since the new correction factor data from in-use operation is not constrained to match the particular speed and load points used to index the lookup table, a method is needed to weight the adjustments made to individual table entries which are closest to the actual speed and load point at which the new data was acquired. Speed and load points actually indexed in the table will be referred to as reference operating points while the speed and load points at which new data is obtained will be referred to as measured operating points. In the equations below, subscripts indicating cylinder number will be omitted to avoid confusion, but it is to be understood that the process must be repeated for each cylinder.

Figure 11:
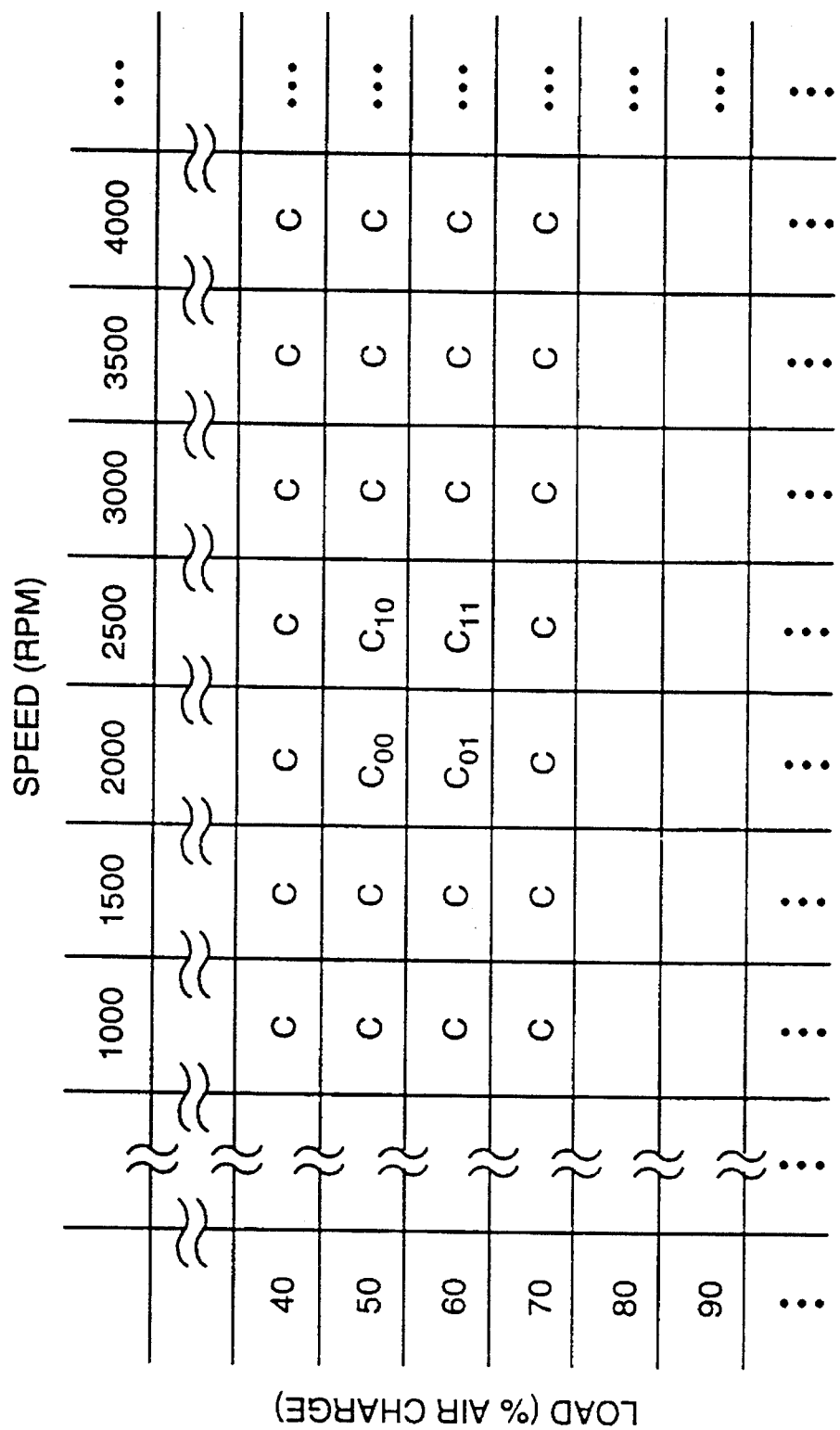
FIG. 11 shows a portion of a table of correction factors stored in memory.

FIG. 11 shows a portion of a table of correction factors indexed by speed (RPM) and load (percent air charge of maximum). Correction factors are provided at the reference operating points that are directly indexed by the speed and load values in the table. Correction factor values for points intermediate the indexed values are interpolated during correction for misfire detection. Each correction factor value in the table is denoted C. The four nearest points in the table surrounding a current measured operating point (x,y) are designated $(x_0, y_0)$, $(x_1, y_0)$, $(x_0, y_1)$ and $(x_1, y_1)$ and the corresponding correction factor values are designated $C_{00}$, $C_{10}$, $C_{01}$ and $C_{11}$, respectively. A linear two-dimensional interpolation equation can be written using the above notation as:

$$C(x,y)=(1-\alpha)(1-\beta)C_{00}+\alpha(1-\beta)C_{10}+(1-\alpha)\beta C_{01}+\alpha\beta C_{11}$$

where $\alpha=(x-x_0)/(x_1-x_0)$ and where $\beta=(y-y_0)/(y_1-y_0)$. Since x falls between $x_0$ and $x_1$, and y falls between $y_0$ and $y_1$, both $\alpha$ and $\beta$ range between 0 and 1. If the point (x,y) happens to coincide with one of the four corner points, the "interpolated" value given by this equation reduces to precisely the indexed table value at that point, as expected.

Since the newly adapted value of C determined at the measured operating point (x,y) is typically different from the value predicted by interpolation from the table (this difference being denoted by δC), the preferred embodiment modifies the four neighboring table values accordingly. In other words, the corrections needed to adjust $C_{00}$, $C_{10}$, $C_{01}$, and $C_{11}$ are calculated so that the interpolated value agrees with the measured value. If the adjustments are denoted by $\delta C_{00}$, $\delta C_{10}$, $\delta C_{01}$, and $\delta C_{11}$, they must satisfy the interpolation equation to achieve the following result:

$$\delta C=(1-\alpha)(1-\beta)\delta C_{00}+\alpha(1-\beta)\delta C_{10}+(1-\alpha)\beta\delta C_{01}+\alpha\beta\delta C_{11}$$

However, this single constraint is not sufficient to uniquely define the four δC's. Infinitely many combinations exist which satisfy this equation to correct the interpolated value in a manner to agree with the measured value. To obtain a unique solution for these four unknowns requires an additional set of constraints chosen on the basis of reasonable behavior. For example, a very logical and sufficient constraint is to require that each of the four adjustments vary inversely with respect to both the x and y distance between the measured operating point and the reference operating point. In other words, if the point of measurements (x,y) lies closer to one corner point than the others, than the adjustment to that reference point's correction factor should be proportionately greater than the others. This condition is mathematically described as:

$$\alpha\beta\delta C_{00}=(1-\alpha)\beta\delta C_{10}=\alpha(1-\beta)\delta C_{01}=(1-\alpha)(1-\beta)\delta C_{11}$$

This condition leads to the following unique solution set:

$$\delta C_{00} = \delta C \frac{(1-\alpha)(1-\beta)}{[\alpha^2+(1-\alpha)^2][\beta^2+(1-\beta)^2]}$$

$$\delta C_{10} = \delta C \frac{\alpha(1-\beta)}{[\alpha^2+(1-\alpha)^2][\beta^2+(1-\beta)^2]}$$

$$\delta C_{01} = \delta C \frac{(1-\alpha)\beta}{[\alpha^2+(1-\alpha)^2][\beta^2+(1-\beta)^2]}$$

$$\delta C_{11} = \delta C \frac{\alpha\beta}{[\alpha^2+(1-\alpha)^2][\beta^2+(1-\beta)^2]}$$

The preceding formulas were found based on the need to define an appropriate set of adjustments to bring the value interpolated from the table into agreement with the newly measured value. In fact, the table value should be modified by only a small fraction of these amounts so as to nudge the interpolated value slightly in the direction of the measured value. This requires addition of a single calibratable parameter λ which serves as a weighting fraction to control the overall rate of adaptation of the table to the newly incoming data. Thus, the four table values encompassing the current measured operating point are adjusted as follows:

$$C_{00}=C_{00}+\lambda\delta C_{00}$$

$$C_{10}=C_{10}+\lambda\delta C_{10}$$

$$C_{01}=C_{01}+\lambda\delta C_{01}$$

$$C_{11}=C_{11}+\lambda\delta C_{11}$$

Although λ may be calibrated to any value between 0 and 1, it is typically very small (i.e., much less than 1), corresponding to a very slow rate of adaptation. Each of the above equations represents an exponentially weighted moving average of the incoming data with a very long time constant.

In an alternate embodiment, the amount of computation can be reduced by adjusting only the single closest reference point in the table to the newly incoming data.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method for detecting malfunctions in an internal combustion engine, comprising the steps of:

measuring an engine variable;

determining a selected diagnostic variable in response to said measured variable and a correction factor, said correction factor having a value in accordance with an operational model of said engine;

producing a diagnostic classification in response to said selected diagnostic variable and a diagnostic criterion, said diagnostic criterion resulting in a first false alarm rate;

generating a malfunction signal when said diagnostic classification is indicative of a malfunction;

producing a safe adaptation classification in response to said selected diagnostic variable and an adaptation criterion, said adaptation criterion resulting in a second false alarm rate higher than said first false alarm rate; and adapting said correction factor by assigning a new value to said correction factor that tends to modify said determination of said selected diagnostic variable toward a predetermined value indicative of normalcy when said safe adaptation classification corresponds to an absence of said malfunction.

2. The method of claim 1 wherein said selected diagnostic variable is crankshaft acceleration and wherein said diagnostic classification identifies whether a misfire occurred in a respective cylinder event.

3. The method of claim 1 wherein said correction factor is obtained from a table of correction factors, each value of a correction factor in said table corresponding to a respective engine operating point defined according to a plurality of predetermined engine parameters.

4. The method of claim 3 wherein said predetermined engine parameters are comprised of engine speed and load.

5. The method of claim 3 further comprising the step of:

measuring said predetermined engine parameters to determine a value from said table of correction factors to be used in determining said selected diagnostic variable.

6. The method of claim 5 further comprising the step of adjusting at least one value stored in said table based on said new value of said correction factor, including at least a value of said correction factor stored corresponding to a reference operating point included in said table that is nearest a measured engine operating point for which said new value was obtained.

7. The method of claim 6 wherein said adjusting step is responsive to 1) a difference between said new value of said correction factor and the value of said correction factor prior to modification, 2) a distance between said measured operating point and said reference operating point, and 3) a weighting fraction.

8. The method of claim 6 wherein said correction factors stored at the four nearest reference operating points to said measured operating point are adjusted.

9. Apparatus for detecting malfunctions in an internal combustion engine, comprising:

a sensor for measuring an engine variable;

a memory for storing a correction factor; and a controller coupled to said sensor and said memory for 1) determining a selected diagnostic variable in response to said measured variable and said correction factor, said correction factor having a value in accordance with an operational model of said engine; 2) producing a diagnostic classification in response to said selected diagnostic variable and a diagnostic criterion, said diagnostic criterion resulting in a first false alarm rate; 3) generating a malfunction signal when said diagnostic classification is indicative of a malfunction; 4) producing a safe adaptation classification in response to said selected diagnostic variable and an adaptation criterion, said adaptation criterion resulting in a second false alarm rate higher than said first false alarm rate; and 5) adapting said correction factor by assigning a new value to said correction factor that tends to modify said determination of said selected diagnostic variable toward a predetermined value indicative of normalcy when said safe adaptation classification corresponds to an absence of said malfunction.

10. The apparatus of claim 9 further comprising an indicator coupled to said controller for annunciating a malfunction in response to said malfunction signal.

11. The apparatus of claim 9 wherein said sensor is comprised of a crankshaft position sensor, and wherein said diagnostic classification identifies whether a misfire occurred in a respective cylinder event.

12. The apparatus of claim 9 wherein said memory stores a table of correction factors, each correction factor in said table corresponding to a respective engine operating point defined according to a plurality of predetermined engine parameters.

13. The apparatus of claim 12 wherein said controller further adjusts at least one value stored in said table based on said new value of said correction factor, including at least a value of said correction factor stored corresponding to a reference operating point included in said table that is nearest the measured engine operating point for which said new value was obtained.

14. The method of claim 13 wherein said controller is responsive to 1) a difference between said new value of said correction factor and the value of said correction factor prior to modification, 2) a distance between said measured operating point and said reference operating point, and 3) a weighting fraction.

15. A method of obtaining correction factors used in diagnosing operation of an internal combustion engine, said correction factors being defined according to an operational model of said engine, said method comprising the steps of:

generating a set of base values of said correction factors by operating a test engine over an operating range including individual operating points;

storing said set of base values in a vehicle including a production engine;

operating said production engine;

sensing an individual operating point of said production engine;

diagnosing a selected diagnostic variable of said production engine in response to a respective base value corresponding to said sensed individual operating point;

detecting a safe adaptation time during operation of said production engine when said selected diagnostic variable indicates that a malfunction is not present;

adapting and storing new values of said correction factors during said safe adaptation time;

sensing an individual operating point of said production engine; and diagnosing said selected diagnostic variable of said production engine in response to a respective new value of said correction factors corresponding to said sensed individual operating point.

\* \* \* \* \*